Aug. 1, 1961  A. C. BYRNS  2,994,582
PRODUCTION OF CRYOLITE
Filed July 16, 1956  4 Sheets-Sheet 1
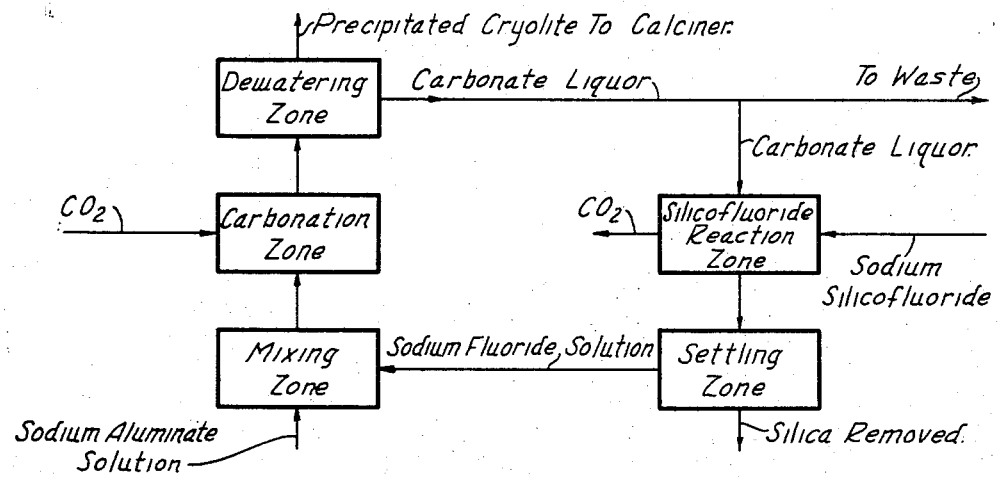
FIG_1_
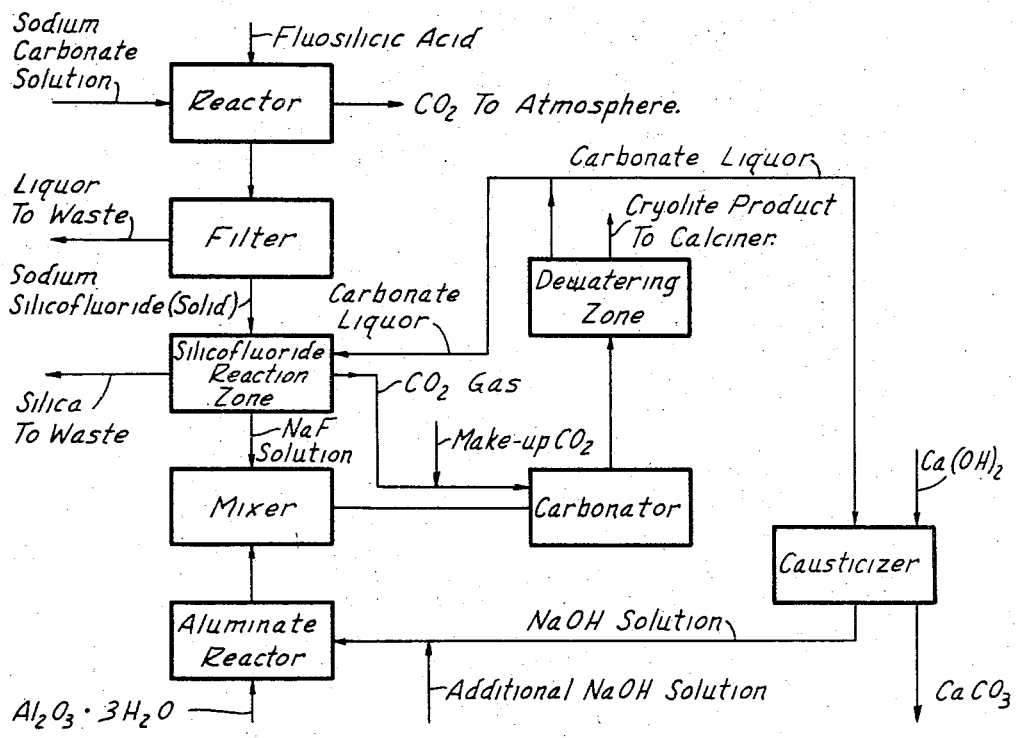
FIG_3_
INVENTOR.
Alva C. Byrns.
BY James E. Toomey
atty.

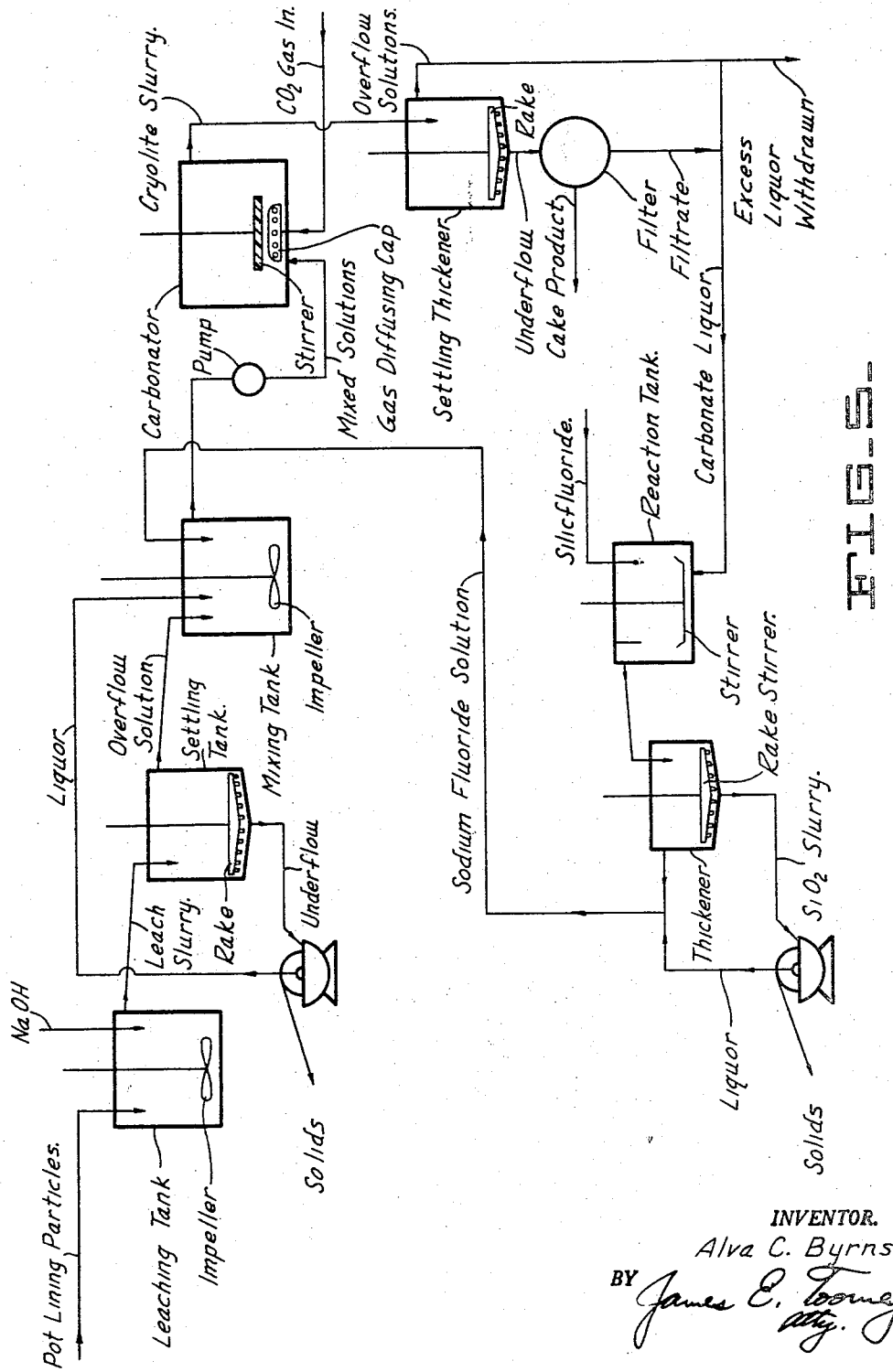

United States Patent Office 2,994,582
Patented Aug. 1, 1961

---

2,994,582
PRODUCTION OF CRYOLITE
Alva C. Byrns, Lafayette, Calif., assignor to Kaiser Aluminum & Chemical Corporation, Oakland, Calif., a corporation of Delaware
Filed July 16, 1956, Ser. No. 598,137
23 Claims. (Cl. 23—88)

This invention relates to the production of cryolite; and more particularly it relates to the synthesis of cryolite of high degree of purity and suitable for use in the aluminum reduction process as a replacement for natural cryolite.

Numerous processes have heretofore been proposed for the synthesis of cryolite; and still other processes have previously been proposed for the recovery of cryolite values from waste gases going off from aluminum reduction cells or from used pot linings which have been employed in electrolytic reduction cells wherein aluminum metal has been produced. For example, it has been proposed to react hydrofluosilicic acid with alumina and caustic alkali or carbonate to form cryolite and silicic acid and to recover the cryolite as a precipitate while keeping the silica in solution in a strongly alkaline medium. It has also been proposed to react sodium fluosilicate, alumina and sodium carbonate by mixing the powdered materials with a small amount of water and heating to 100° C. to obtain a mixture of silica and sodium aluminum fluoride which is useful only, for example, in certain ceramic operations. Still other processes have been proposed wherein used pot linings from electrolytic aluminum reduction cells have been leached with caustic and the leach liquor reacted with hydrogen fluoride or sodium fluoride, especially in large excess, and then treated with an acid such as carbon dioxide to precipitate cryolite. However, disadvantages have been found in these methods because in some of them the product contains undesirable and harmful impurities, such as silica and alumina; and in some, at least, of the processes the fluoride values, which are scarce and costly, are not economically recovered, and, in fact, appreciable amounts thereof are lost in the final waste products. Also, many of the prior art processes are expensive, whereas cheaper sources of cryolite, artificial or synthetic, are desired in order to make the production thereof and in use, for example, aluminum reduction cells, economically feasible or advantageous. Good sources of synthetic cryolite are desired for regions where a supply of natural ore is lacking and where importation of such ore would be too expensive.

It is an object of the present invention to provide a method for making artificial cryolite of high purity. It is another object to provide a method for making such cryolite which is inexpensive and economically advantageous. It is a further object to provide such a method which enables recovery of valuable components from used cathode material and which enables utilization of the sodium fluoride recovered or recoverable from sodium silicofluoride. It is a further object of this invention to provide a method of producing sodium fluoride from sodium silicofluoride.

According to the present invention, cryolite is produced, that is, is synthesized with excellent recovery of fluorine values by a process wherein sodium silicofluoride compound is continuously introduced into a reaction zone to which there is also continuously added a stream of dilute aqueous solution of sodium carbonate, and the two components are admixed and reacted to form sodium fluoride and silica; and the sodium fluoride remains in solution and is separated from the silica, which precipitates. The fluoride solution so recovered is then admixed with an aqueous solution sodium aluminate in amounts to provide a substantially stoichiometric ratio of aluminum-to-fluorine, based on cryolite, $3NaF \cdot AlF_3$; and the solution admixture is then treated with carbon dioxide gas to precipitate cryolite. The precipitated cryolite and the residual liquor are separately recovered, and the cryolite is suitably heated to dry the same. The residual liquor, which is a dilute aqueous solution of sodium carbonate and bicarbonate, is withdrawn and continuously admixed with a fresh amount of silicofluoride compound and reacted to form sodium fluoride and to precipitate silica as herein described. By silicofluoride compound is meant at least one compound chosen from the group consisting of hydrofluosilicic or fluosilicic acid and sodium silicofluoride.

FIGURES 1, 2, 3 and 4 are diagrammatic flow sheets illustrating several embodiments of the present invention and showing, in particular, variations and advantageous operations at certain stages of the process.

FIGURE 5 shows in a diagrammatic manner some equipment suitable for carrying out the process of this invention.

Figure 2:
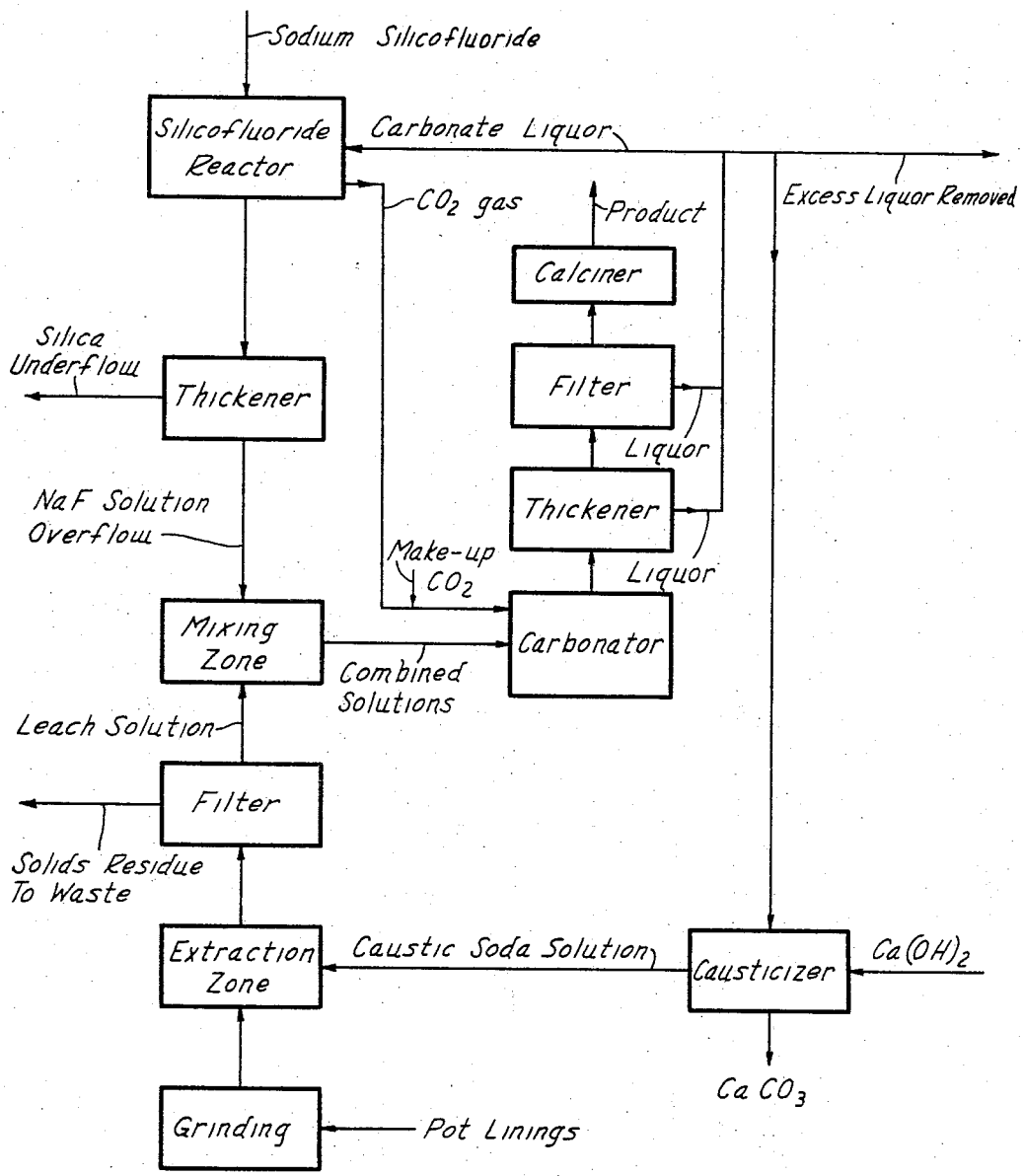

The sodium fluoride component for the desired cryolite is prepared from sodium silicofluoride or fluosilicic acid. The sodium silicofluoride is continuously reacted with a dilute aqueous carbonate solution which contains sodium carbonate and sodium bicarbonate in varying proportions depending upon carbonating conditions. The solution of such carbonate and bicarbonate is obtained as a residual liquor in the cryolite-precipitation stage of this process, as will be described below. In the preparation of sodium fluoride solution, sodium silicofluoride or fluosilicic acid is continuously added to the aqueous alkaline solution with thorough stirring, and the reaction proceeds quite readily, according to one or both of the following equations:

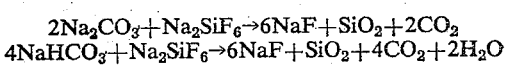

$$2Na_2CO_3 + Na_2SiF_6 \rightarrow 6NaF + SiO_2 + 2CO_2$$
$$4NaHCO_3 + Na_2SiF_6 \rightarrow 6NaF + SiO_2 + 4CO_2 + 2H_2O$$

The sodium fluoride which is produced remains in solution in the water, the carbon dioxide goes off as a gas, and the silica precipitates. When fluosilicic acid is the starting material, in one embodiment greater amounts of sodium carbonate or bicarbonate are continuously admixed as described with respect to the sodium silicofluoride, to form like end products, according to the following equations:

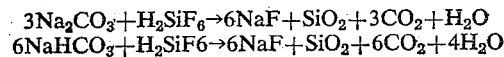

$$3Na_2CO_3 + H_2SiF_6 \rightarrow 6NaF + SiO_2 + 3CO_2 + H_2O$$
$$6NaHCO_3 + H_2SiF_6 \rightarrow 6NaF + SiO_2 + 6CO_2 + 4H_2O$$

The carbonate solution is alkaline in reaction and contains a small amount, e.g. about 5 to 8%, calculated as sodium ion, of excess alkali. The solution preferably is of pH 7.5 to 10.0. The carbonate solution is dilute, containing, for example, from about 0.25 mol to 1.5 mols sodium ion, $Na^+$, and preferably from 0.5 to 1 mol thereof per liter of solution. The solution contains essentially sodium carbonate, sodium bicarbonate, or both, and a small amount of sodium fluoride. The reaction is carried out in a continuous manner, and the silica which precipitates is separated from the solution and is discarded or stored for use in other processes as desired. The reaction products consist essentially of an aqueous solution of sodium fluoride and silica which precipitates and is readily filtered or separated from the sodium fluoride solution. Although carbon dioxide gas is also formed by the reaction, it readily bubbles off leaving the two aforementioned products. The sodium fluoride solution recovered is very low in silica content, and it is then admixed with sodium aluminate solution in such amount as to provide a substantially stoichiometric proportion or ratio of aluminum-to-fluorine, calculated as, or based upon, cryolite.

The expressions "consist essentially" or "consisting essentially," as used in the specification and appended claims mean that the reaction products are the sodium fluoride solution and silica and that other substances in amounts sufficient materially to affect the characteristics of the reaction products are not included, although other substances may be present in minor amounts which do not affect such desirable characteristics. Carbon dioxide gas is formed by the reaction; however, as it bubbles off, it is therefore not included in this definition of the reaction products.

It is advantageous to carry out the reaction between the silicofluoride and carbonate liquor at a temperature of from 60° C. to 95° C. and to a final pH of from 7 to 8, preferably from over 7 to less than 8, to obtain a silica precipitate which settles most readily and is readily filtered or otherwise separated from the fluoride solution. The carbon dioxide gas formed in this reaction is, if desired, collected and recycled to the carbonation zone. The total treatment or retention time for the reactants in this zone is preferably at least about one hour, and suitably not over 2.5 hours, but in usual practice reaction will be complete in from one to two hours. Preferably, there is added in this reaction about 5% to 8% excess carbonate or bicarbonate over the stoichiometric amount to insure complete reaction and precipitation of the silica. The silica is most easily and economically separated by filtration, and it is advantageous to withdraw the slurry from the reaction zone to a thickening zone from which a thickened sludge of silica precipitate is withdrawn as underflow, the clarified fluoride solution taken off as overflow, the underflow filtered to recover silica as filter cake, and the filtrate then combined with the withdrawn clarified liquor overflow. Settling and separation of the silica are facilitated by the addition of a small amount of a flocculating agent available in commerce at the present time under the trade name of Aerosol C-61, manufactured and sold by American Cyanamid & Chemical Corporation. In a preferred operation, the silica precipitate is thickened to about 13% solids and is then filtered on a rotary vacuum filter, whereby there is obtained a silica filter cake containing about 40% solids. The overflow liquor from the thickener and the filtrate are aqueous solutions containing the desired sodium fluoride, and are sent to a mixing zone to be admixed with sodium aluminate-containing solution, as will be further described. The sodium fluoride solution produced may instead of being used in cryolite production, be used for other well known purposes, it being merely necessary to recover the sodium fluoride as crystals from the water solution by well known procedures.

The sodium aluminate to be admixed with the sodium fluoride solution is obtained from any desired source. One suitable material is aqueous sodium aluminate solution obtained in the well-known Bayer process for making alumina. A sodium aluminate solution suitable for use in the present invention is also produced by dissolving scrap aluminum in caustic soda solution, preferably dilute solution, this reaction going readily in the well-known manner. Sodium aluminate solution is also suitably made by reacting alumina or alumina hydrate from any source with caustic soda or soda ash to form sodium aluminate.

A useful starting aluminate material is obtained by leaching with caustic soda solution, used carbonaceous pot linings recovered from electrolytic aluminum reduction cells which have been operated to produce aluminum metal, whereby there is recovered an aqueous solution containing sodium aluminate and also some sodium fluoride. The electrolytic baths employed in the fused salt electrolysis of alumina to produce aluminum metal consist essentially of cryolite, in usual practice sodium cryolite, having alumina dissolved therein and containing also a small quantity, e.g. about 5%, of fluorspar, calcium fluoride, and, if desired, a small amount of sodium chloride or other freezing point depressant. In recovering the desired aluminum and fluorine values from linings which have been used with such baths, the linings are crushed and ground, preferably to particle size substantially entirely passing 20 mesh, and then admixed with caustic soda solution, preferably a dilute solution, for example, containing 20 to 30 gms. NaOH per liter, in an amount sufficient to maintain the sodium fluoride and aluminate in solution, at a temperature of from 45° C. to 100° C., preferably at from 60° C. to 95° C., to extract the aluminum and fluorine values. Suitably, the solids material and caustic solution are maintained at such temperature with constant agitation to effect extraction; but, alternatively, the leaching solution is percolated through a bed of the solid material, for instance, in a tower wherein the solids are arranged on trays, to effect such extraction. In one method of operation, the solids are made into a slurry with water and the slurry is admixed with sodium hydroxide solution with suitable agitation. After leaching or extraction is completed, the solution and the residual solids are separately recovered and this is usually conveniently done by filtering. The solution so recovered contains sodium aluminate and also a considerable amount of sodium fluoride. As stated above, the extraction is carried out at a temperature above room temperature, for example, at from 45° C. to 100° C.; and it is preferred to extract at from 60° C. to 95° C. to recover the greatest amount of fluorine values. Alternatively, in separating the solids from the liquor, the extraction mass is allowed to settle, the "black mud" (carbonaceous residue) settled sludge is drawn off, and the supernatant liquid decanted, or decanted and filtered, if necessary; or the black mud is alternatively removed by centrifuging, if desired.

In still another embodiment, the sodium aluminate starting material is prepared by reacting sodium hydroxide with alumina hydrate, especially by a process wherein concentrated aqueous caustic soda solution is mixed with alumina hydrate and the admixture heated to boiling. The caustic soda solution preferably contains 40% to 50% NaOH, and is mixed with the hydrate in an amount to provide about one part NaOH per part $Al_2O_3$. Sufficient water is then preferably added to produce a final solution of sodium aluminate of about twice the volume of the incoming caustic solution.

The sodium fluoride solution and sodium aluminate solution are admixed in proportions to provide an approximately stoichiometric fluorine-to-aluminum ratio, based on cryolite, although it is to be understood that a small excess up to about 10% by weight of either component can be present. In a preferred embodiment and to obtain highest yields, the fluorine content, calculated as $F^-$, is of concentration preferably from 10 to 14 gms. per liter of the combined solutions. The fluorine-to-aluminum weight ratio is preferably from 4.0 to 4.5, and optimum precipitation efficiency has been obtained at a ratio of 4.23. Other concentrations of the aluminum and fluorine values are useful in carrying out the process of this invention, but the efficiency of precipitation and the quality of the product are greatest when operating within the preferred concentrations.

The admixed liquor containing in aqueous solution sodium aluminate and sodium fluoride is now carbonated by addition thereto of carbon dioxide gas. There is employed gas consisting essentially of carbon dioxide or gas containing carbon dioxide. For example, flue gas, exhaust gases issuing from the zone wherein the cryolite product is being calcined, or carbon dioxide gas recovery from the silicofluoride reaction zone described above, can be used to carbonate the admixed liquor. Preferably, there is employed a carbonating gas containing at least 10% $CO_2$. The carbonation step is carried out batchwise or in a continuous manner as may be desired in any given plant installation. As carbon dioxide is added or introduced into the aluminate-fluoride liquor, cryolite starts to precipitate at about pH 12.2 and addition of carbon dioxide is continued until the pH is reduced to about 8.0 to 10.0. However, in a preferred and more economical operation, $CO_2$ is added until the solution being carbonated exhibits about pH 9.0 to 9.5.

Carbonation is carried out at normal or room temperature or at increased temperature, and, for example, by bubbling the gas through the solution being treated, in any desired manner. Carbonation at a temperature of from 30° C. to 70° C. is especially advantageous. Particularly good results, both as to crystalline character and settling and filtering characteristics of the cryolite product and as to efficiency of carbon dioxide absorption, have been observed when the carbonation is carried out at a temperature of around 60° C., in part because larger particles of precipitate are produced by such procedure and such particles settle more rapidly and are more easily filtered. The precipitate is washed with fresh water, either in the thickener or on the filter. The precipitation efficiency of this carbonation stage, based on fluorine available in the solution being treated, is over 90% and in the preferred operation is at least 95%, when using an F/Al ratio of 4.23. The retention time in the carbonator or carbonation zone is preferably from about one hour to 2.5 hours, especially when operating at a temperature of from 30° C. to 70° C.; but this retention time is varied by varying the rate of introduction of carbon dioxide. That is to say, at a lower rate of introduction a longer retention time is employed; and at a higher or faster rate, a lesser time is employed. If desired, cryolite seed crystals can be provided in the carbonation zone and these can be obtained from any source, i.e., there can be used seed crystals of natural cryolite, of cryolite prepared by another process, or as previously precipitated in the present process.

The cryolite precipitate obtained filters very readily and is most conveniently separated from the residual liquor by thickening and then filtering. Alternatively, it is separated by settling and decantation, centrifuging or other desired means, or any combination of the mentioned methods. The cryolite is dried and calcined at a temperature of from about 500° to 700° C. In a preferred embodiment the cryolite product is heated for about two hours at a temperature of about 650° C. to reduce water content to not over 0.5%. Calcination is effected in any desired apparatus. For example, it can be carried out in a muffle furnace, a mechanically rabbled furnace, or a multihearth furnace.

The residual aqueous liquor which is separated from the solids which have been precipitated in the carbonation zone contains sodium carbonate and sodium bicarbonate, the reaction in the carbonation step proceeding according to the following principal equations:

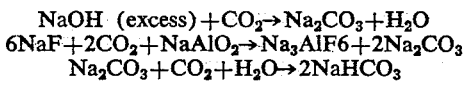

$$NaOH \text{ (excess)} + CO_2 \rightarrow Na_2CO_3 + H_2O$$
$$6NaF + 2CO_2 + NaAlO_2 \rightarrow Na_3AlF_6 + 2Na_2CO_3$$
$$Na_2CO_3 + CO_2 + H_2O \rightarrow 2NaHCO_3$$

The relative amounts of sodium carbonate and sodium bicarbonate depend upon the extent to which carbonation is carried, as can be seen from the above equations because as more carbon dioxide is added, more bicarbonate is formed. Thus, in different plant operations, the concentration of carbonate and bicarbonate may vary, but both compounds will react with the silicofluoride. The liquor also contains other substances, such as a small amount, for example, from 0.5 to 2.0 gm. per liter, of fluorine in the form of sodium fluoride. These additional substances are not harmful and are recycled in the system. The liquor is employed in the step of recovering or producing sodium fluoride from sodium silicofluoride, as described above. If desired, the liquor recovered from the carbonated material is split or divided into two parts or streams, one of which goes to the silicofluoride-treating process and the other of which is reacted with an alkali, preferably slaked lime or calcium hydroxide, to regenerate caustic soda and form calcium carbonate. In such process, the calcium carbonate precipitates and is removed, and the caustic soda remains in aqueous solution and is recycled, for example, to the pot lining extraction zone or stage, or to react with alumina hydrate, to form aluminate starting solution, if desired.

It is an advantage of the present invention that a high quality cryolite of high purity is obtained. It is an advantage also of this process that silica is precipitated, in the treatment of the fluosilicic acid or sodium silicofluoride, in a form in which it is readily removed from the sodium fluoride solution. It is a great advantage of this invention that it enables the production of high purity cryolite from a byproduct fluosilicate from phosphate ore processing and thus enables the utilization of these ore deposits in an economical manner. It is a further advantage that the sodium fluoride is retained in solution at the silica removal stage, which results in greatly improved efficiency of recovery of the fluorine values.

The following examples will illustrate more clearly modes of carrying out the process of this invention.

*Example 1*

Sodium silicofluoride in finely divided form is continuously fed into a reaction zone, and there is simultaneously fed continuously into this zone a carbonate liquor obtained in a previous precipitation of cryolite by treatment of a solution, containing fluorine and aluminum values, with carbon dioxide, according to the present invention. The entering carbonate liquor is at about pH 9.4, and as the reaction between silicofluoride and carbonate liquor proceeds, the alkalinity drops to between pH 7.0 and pH 8.0. The carbonate liquor which is introduced contains 12 parts of sodium ion per 1000 parts of water, a small part of the sodium being present in combination with some residual fluorine, being calculated as about 0.75 part by weight of sodium combined as sodium fluoride, although there may be a small amount of residual, unprecipitated cryolite remaining in solution in any such carbonation process. The liquor is continuously introduced in an amount to provide 47.55 parts sodium ion per 89.8 parts of silicofluoride. The reaction slurry is continuously agitated and is maintained at a temperature of about 60° C. Carbon dioxide gas which is evolved is withdrawn. Suitably, the reacted slurry is withdrawn intermittently or continuously, as desired, being retained under reaction conditions until a test sample shows no remaining silicon in the clear, aqueous solution. The reaction slurry when withdrawn is conducted to a zone where the silica, which has precipitated during the reaction, is permitted to settle and is separately drawn off. The aqueous liquor, which contains the sodium fluoride in solution, is separately recovered; and contains 69.50 parts of sodium ion and 57.48 parts of fluorine ion in 4225 parts of water. This liquor is now thoroughly admixed with sodium aluminate solution in water in a ratio to provide 3.03 parts aluminum ions, 13.52 parts fluorine ion and 19.64 parts sodium ion per 1000 parts water. The admixed solution is now carbonated in a carbonation zone by introducing thereinto carbon dioxide gas, the carbonation zone being maintained at a temperature of 45° C. to 50° C., the reaction being continued until the pH is about 9.4. The cryolite precipitates during this reaction, and the precipitated cryolite is separated from carbonate solution or liquor suitably by withdrawing the slurry from the reaction zone to a settling zone where it is slowly stirred to obtain a thick underflow containing the precipitate and an overflow of carbonate liquor. The overflow contains in solution sodium carbonate and sodium bicarbonate, and a small amount, about 0.76 part fluorine ion per 1000 parts water, the total content of sodium ion being about 12.01 parts per 1000 parts water. A small amount of this liquor is continuously removed from the system to avoid buildup of sodium ion concentration. In this example, sufficient carbonate liquor is bled off or continuously removed to maintain a sodium ion concentration of about 12.0 parts per 1000 parts water, and liquor of this concentration is then sent to the silicofluoride reaction zone as described above. The silica removed in the silicofluoride reaction is sent to waste or utilized in any desired manner.

The liquor which is carbonated as described above in this example contains fluorine and aluminum in a ratio of 4.47:1. The cryolite which is recovered by precipitation with carbon dioxide is dewatered, washed and then calcined at a temperature of about 650° C. to obtain dehydrated cryolite containing 95% cryolite, $3NaF \cdot AlF_3$, 3% NaF, 1.2% alumina and 0.8% undetermined impurities. A suitable flowsheet for this example is shown in FIGURE 1.

*Example 2*

This example is illustrated by the flowsheet of FIGURE 2. In this embodiment powdered sodium silicofluoride is introduced into a reaction vessel fitted with a stirrer, and carbonate liquor, recovered in a previous precipitation of cryolite by treatment of a suitable solution, as will be described, with carbon dioxide gas according to the present invention, is continuously added to this vessel and intimately mixed with the silicofluoride. The entering carbonate liquor is at about pH 9.4, and the alkalinity drops to about 7.5, as the reaction proceeds. The carbonate solution which is introduced contains 14.7 parts by weight of sodium ion per 869 parts by weight of water, most of the sodium being combined as the carbonate and bicarbonate but a small amount, about 0.85 part, being present in combination with the fluorine, calculated as sodium fluoride. There are admixed with this carbonate solution 28.2 parts by weight of sodium silicofluoride per the above amount of carbonate liquor of the composition shown. The reaction zone is maintained at a temperature of 80° C. and contains about 5% excess alkali, calculated as sodium ion. The reactants are added continuously and retention time in the reaction zone is about one hour, the reaction mixture being stirred sufficiently to keep the solids in suspension. Silica precipitates during the reaction, and reacted slurry is continuously withdrawn to a quiet zone or thickener where the silica is settled with addition of about 0.2 lb. Aerosol C–61 per 100 lbs. silica; the silica is withdrawn as sludge underflow, containing about 12% solids, and the clarified supernatant solution of NaF is recovered as overflow. Carbon dioxide evolved is sent to the carbonation zone. Although not shown in this flowsheet, it is advantageous and economical to thoroughly dewater the silica sludge by filtration and return the recovered liquor containing sodium fluoride to the system. In such filtration, there is obtained a silica filter cake containing 40% solids. The liquor removed as overflow from the reaction zone contains 13 grams fluorine and 15.78 grams sodium per 1000 grams water, being combined essentially as sodium fluoride, and it is admixed with a liquor obtained as described below and containing available sodium aluminate.

Carbonaceous pot linings or cathodes removed from electrolytic cells wherein aluminum has been produced by the well-known Hall process are ground to a particle size substantially entirely passing through a 20 mesh screen, and the ground material is mixed with dilute, aqueous, caustic soda solution containing in this example about 26 grams NaOH per liter and obtained by causticizing, or reacting with lime, of a portion of the carbonate liquor recovered from the precipitation of cryolite in this process. The mixture of ground cathode material and caustic solution is maintained at a temperature of about 95° C. for about two hours, with stirring, then the residue or "black mud" is filtered off and discarded. The residue can be separated from the liquor in any other desired manner, but filtration is generally preferred. The solution, which is recovered, contains 13.76 grams fluorine, 4.42 grams aluminum and 28.53 grams sodium per 1000 grams of water; and is now admixed with the above described sodium fluoride solution in amounts to provide a solution or liquor containing 13.5 grams fluorine per 1000 grams of water and containing aluminum to provide a fluorine-to-aluminum ratio of 4.50.

The admixed liquor is now treated in a carbonation zone by introducing thereinto carbon dioxide withdrawn from the silicofluoride reaction zone as described above, and there is also introduced additional $CO_2$ in the form of flue gas containing about 10% $CO_2$. The carbon dioxide gas is introduced into thorough admixture with the liquor, the carbonation zone being maintained at a temperature of about 60° C. and the gas being bubbled in over a period of about 1.75 hours for a total addition of about 50 to 75 vols. gas per volume of liquor, the reaction being continued until the liquor exhibits pH 9.4. The cryolite precipitates during this reaction and is withdrawn to a dewatering zone, including a thickener where it is stirred by means of a slowly revolving rake to obtain a thick underflow of cryolite product and an overflow of liquor which is a solution of sodium carbonate and sodium bicarbonate, and which contains a small residual amount, about 0.85 gram per liter, of fluorine. The thickened underflow is filtered on a rotary drum vacuum filter, the filtrate being added to the thickener overflow liquor. The filter cake, containing about 75% solids, is preferably washed with fresh water; and the washed cake is calcined by heating in a multiple hearth furnace with rabbling to about 650° C. to obtain dehydrated cryolite containing 1.2% alumina, 3.0% sodium fluoride and 0.8% other impurities including silica, the remainder being sodium cryolite. The liquor overflow goes in part to the silicofluoride reaction zone as described above; and in part to the causticizing zone where it is reacted with lime to precipitate calcium carbonate, which is discarded, and to regenerate NaOH, which is later used to extract alumina and other values from further amounts of used pot linings.

A small amount of the carbonate liquor is continuously bled from the system in order to maintain the proper sodium ion concentration because some sodium ion is recovered from the pot linings, and the total sodium tends to be in excess of that required for the formation of cryolite and therefore would tend to build up unless removed in suitable amounts from the system. The efficiency of the fluorine precipitation is 93.7%.

*Example 3*

Fluosilicic acid is fed to a reaction vessel and there mixed with a sodium carbonate solution in water in the relative amount of 68.6 parts fluosilicic acid and 50.4 parts sodium carbonate. Carbon dioxide formed is vented to the atmosphere, but, if desired, it can be cycled to the carbonators. Sodium fluosilicate precipitates and is recovered by filtration and is then continuously introduced into another reaction vessel where it is admixed with carbonate solution coming in a continuous stream from a zone where cryolite is precipitated according to a later stage in the present process as will be described, there being added, thereby, in this zone 43.81 parts of sodium ion as sodium carbonate and sodium bicarbonate, per 89.6 parts of the precipitated sodium silicofluoride. The silicofluoride reaction zone is maintained at a temperature of about 80° C., and the reaction slurry is constantly stirred, being retained in the reaction zone for about one hour or until the clear aqueous liquor is free of silica. The reaction slurry, after reaction is substantially completed, is withdrawn to a settling zone (not shown in the accompanying flowsheet, FIG. 3) where the silica which precipitates during the reaction settles to the bottom of the zone and is withdrawn. The clear, supernatant liquor, which contains the sodium fluoride which has been formed in the reaction, is drawn off either continuously or intermittently as desired, and is then mixed with sodium aluminate solution made as described below. The carbon dioxide evolved in this reaction is withdrawn and sent to the carbonation zone (later described).

Alumina trihydrate, $Al_2O_3 \cdot 3H_2O$, is mixed with excess caustic soda solution in water and heated to form sodium aluminate according to the process well known to the art. The resulting solution contains 12.86 parts aluminum ion and 20.00 parts sodium ion in 685 parts water and is continuously admixed in this proportion with the above described sodium fluoride solution containing 54.28 parts fluorine and 65.71 parts sodium in 3335 parts water, the resulting mixed solution having a fluorine-to-aluminum ratio of 4.22. This solution is now sent to the carbonators, where it is treated with the $CO_2$ recovered in making the sodium fluoride as described above. It is usually necessary to add also some make-up $CO_2$, to compensate for losses normally occurring in such system. The carbon dioxide gas is bubbled into the mixed solution, and the carbonation zone is held at a temperature of about 50° C. In this example, the liquor is passed suitably through a three-stage carbonator in continuous flow, and carbon dioxide is introduced into the liquor at each stage. The cryolite is completely precipitated by the end of the last stage and the slurry of precipitate in residual liquor is withdrawn to a settling zone, and the thickened precipitate is filtered and then calcined as in the preceding examples, the product being of purity equal to that of the products of those examples. The residual or carbonate liquor recovered separately from the precipitate contains 52.90 parts sodium ion in 3987 parts water, and about 82.8% thereof is recycled to the silicofluoride reaction zone to react with the incoming sodium silicofluoride to form NaF and $CO_2$, both of which are further employed in this process, and silica which is discarded. The remainder of the carbonate liquor, containing 9.09 parts sodium ion in 685 parts water is causticized or reacted with lime to form NAOH which remains in solution and calcium carbonate which precipitates and is removed and discarded. The NaOH solution is then recycled to the aluminate reactor to assist in forming sodium aluminate as described above. FIGURE 3 illustrates a suitable flowsheet for this example. Alternatively, the fluosilicic acid is added directly in the silicofluoride reaction zone, and sufficient sodium carbonate or bicarbonate, or both, is added to enable formation of sodium silicofluoride, in addiiton to the amount of these sodium compounds required to produce the fluoride and other products of the silicofluoride reaction described.

Alternatively, the embodiment of Example 3 is carried out by starting with sodium silicofluoride from any other desired source in which embodiment it will be understood that the step of reacting fluosilicic acid with sodium carbonate is omitted and sodium silicofluoride from another source is employed instead of the precipitated sodium silicofluoride described.

*Example 4*

In this example sodium silicofluoride is reacted with carbonate liquor in a continuous operation whereby powdered sodium silicofluoride and a stream of carbonate liquor are added in proportions to provide a total of 49.76 parts sodium ion in 2342 parts water in a reaction zone maintained at a temperature of 95° C. The carbonate liquor contains 33.95 parts sodium ion in 2309 parts water, and the sodium silicofluoride contains 16.21 parts sodium ion and 33 parts water. The reaction mixture is continuously stirred and after a retention time of about 45 minutes, is continuously withdrawn to a second reactor vessel where stirring is continued until the clear aqueous solution is substantially free of silicon and reaction is complete. The mixture or slurry is then withdrawn to a quiet zone where the silica is settled to a thick sludge and removed as underflow, and the clear overflow liquor, which is essentially an aqueous solution of sodium fluoride containing 17.55 parts fluorine and 21.25 parts sodium per 1000 parts water. This solution is then continuously mixed with sodium aluminate solution prepared as described below.

90.95 parts of carbonaceous cathode linings taken from reduction cells which have been in use in the well-known Hall process for making aluminum metal are crushed and ground to finely divided form, preferably substantially all passing through a 20 mesh screen, and the finely divided material is mixed with excess caustic soda solution containing 14.70 parts sodium per 1000 parts water and heated to about 50° C. with stirring to obtain an aqueous liquor containing 29.79 parts sodium, 14.37 parts fluorine and 4.61 parts aluminum per 1000 parts of water. After extraction is completed, the "black mud" residue is filtered off and the aluminate solution recovered. In another reaction vessel, 22.11 parts aluminum oxide trihydrate are mixed with another portion of the above caustic soda solution containing 14.7 parts sodium per 1000 parts water and heated to cause reaction to form sodium aluminate solution containing 14.7 parts sodium and 9.44 parts aluminum per 1000 parts water. The caustic soda solution used in preparing the sodium aluminate solutions is obtained as in Example 3 by causticizing or reacting with lime (in stoichiometric amounts), a portion of the carbonate liquor recovered from the carbonation zone as will be later described.

Figure 4:
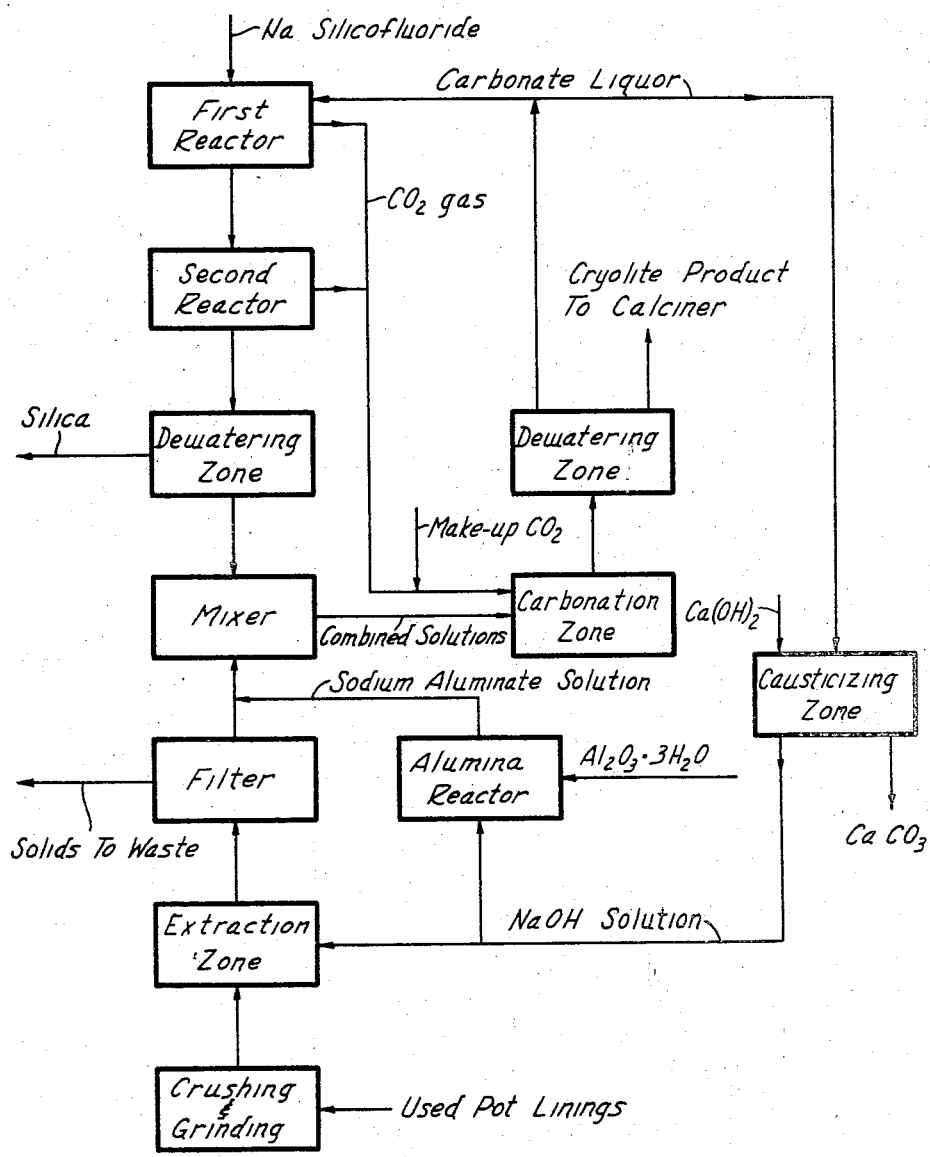

The two aluminate solutions are now mixed together and with the sodium fluoride solution recovered from the silicofluoride reaction to provide an aqueous liquor containing in solution 13.5 parts fluorine, 3.0 parts aluminum, and 22.25 parts sodium per 1000 parts water, the fluorine-to-aluminum ratio being 4.50. This liquor is carbonated and the precipitated cryolite recovered and calcined as described in Example 3. The carbonate liquor recovered contains about 0.85 part residual fluorine and 14.7 parts sodium per 1000 parts water and a major portion of it is recycled to the silicofluoride reaction zone where it enters into reaction with the incoming silicofluoride as above described. The remainder of the carbonate liquor is causticized as has also been described above. FIGURE 4 demonstrates a flowsheet suitable for carrying out the embodiment of this example. The product obtained hereby contains 95% cryolite, 3.0% NaF and 2% impurities.

In the above examples, the extraction of the reduction cell linings is carried out at a temperature of from 45° C. to 100° C., preferably within the range of 60° C. to 95° C. In settling the silica, which has been precipitated in the silicofluoride reaction zone, after withdrawal of the reaction slurry to a quiet or settling zone, a settling aid is added if desired. For example, there is thus added from 0.1 to 0.3, preferably 0.2 lb., of Aerosol C–61 described above dissolved in ethanol per 100 lbs. silica precipitated. In reacting alumina or hydrated alumina with caustic, more than the stoichiometric amount of caustic is employed according to known practice, but if the reaction is carried out under pressure, approximately stoichiometric amounts of caustic can be employed. For convenience reference is frequently made herein to "carbonate" liquor or solution as reactant, but it is to be understood that such liquor contains the carbonate or bicarbonate or both.

Solutions can be employed in this process containing fluorine ion in up to saturation amounts, for example, containing up to about 19 grams fluorine ion per liter when employing the sodium compounds; and there can also be employed concentrations of aluminate in up to saturation amounts, while observing the desired fluorine-to-aluminum ratios. The preferred ranges given in this specification, however, are advantageously employed under ordinary practical conditions of operation. Sufficient water is employed in the system to maintain the valuable compounds in solution.

The pot linings referred to herein are also known as cathodes or cathode shells and are carbonaceous; and they are recovered from cells which have been separated to produce aluminum metal by fusion electrolysis, and they contain alumina and fluorine values because during operation they will have absorbed substantial amounts of cryolite and other fluoride compounds and alumina. By "fluoride or fluorine value or values" is meant fluorine compounds from which fluorine is recovered in this process as cryolite or sodium or potassium fluoride. By "aluminum value" is meant aluminum compound from which aluminum is recovered in this process as cryolite or alumina or hydrated alumina. The extraction of the used pot linings provides both fluorine and aluminum values. For example, such extraction in a commercial operation may provide up to one-half or more of the fluorine required for the cryolite production. The pot linings can be employed in larger sizes, but the speed of leaching and efficiency of the caustic extraction are improved by starting with linings which have been ground to a particle size substantially entirely less than 20 mesh. If desired, some fluoride, as obtained by washing gases evolved in the aluminum reduction operation is added in the starting materials. The fluorine precipitation efficiency in the carbonation step is usually about 95%; and the fluorine which is not precipitated becomes essentially a constant circulating amount in this process.

The silica which is precipitated in the silicofluoride reaction is expressed herein as simple silica or silicon dioxide $SiO_2$, but it will be understood that the precipitated silica is probably hydrated although the amount of hydration is unknown. The silicofluoride reaction is continued until the solution is substantially free of silica. For instance, up to about 0.05 grams silica per liter can be present in the overflow for optimum results; but more can be present provided the cryolite obtained is of adequate purity with respect to silica, that is, contains not over about 0.5% thereof.

Carbonation is carried out, as desired, either as a batch operation or as a single-stage continuous or multi-stage continuous procedure. Batch or multi-stage continuous operations are advantageous in that some aluminum value tends to precipitate faster than the fluorine and is not brought down as cryolite, but upon longer contact with the liquor being carbonated, is converted to cryolite, this being best effected by the batch or multi-stage procedure.

In this specification and claims, parts are by weight except where otherwise indicated. The mesh sizes referred to are U.S. standard sizes as set forth at page 2797 of the Handbook of Chemistry and Physics, published by the Chemical Rubber Company, 32nd Edition, 1950–1951. The fluorine-to-aluminum ratio or factor is determined by divided parts by weight of fluorine by parts by weight of aluminum.

Having now described the invention, what is claimed is:

1. Process for producing cryolite which comprises continuously introducing into a reaction zone at least one silicofluoride material chosen from the group consisting of sodium silicofluoride and fluosilicic acid, and a stream of dilute aqueous solution of sodium carbonate containing a small excess of sodium carbonate, admixing and reacting said materials to form reaction products consisting essentially of an aqueous solution of sodium fluoride and silica, precipitating the readily filterable silica, separately recovering said fluoride solution and admixing therewith an aqueous solution of sodium aluminate in an amount to provide from 10% excess aluminum to 10% excess fluorine, based on the composition of cryolite, then passing carbon dioxide gas into said admixed aluminate-fluoride solution at a temperature of from 30° C. to 70° C. to precipitate cryolite, separately recovering said precipitated cryolite and residual carbonate liquor and introducing said residual liquor into admixture with fresh amounts of said silicofluoride material.

2. Process for preparing cryolite which comprises continuously introducing into a reaction zone maintained at from 60° C. to 95° C., a silicofluoride material chosen from the group consisting of fluosilicic acid and powdered sodium silicofluoride, and a stream of dilute aqueous solution of sodium carbonate containing a small excess of sodium carbonate, admixing with agitation and reacting said materials to form reaction products consisting essentially of an aqueous solution of sodium fluoride and silica, precipitating the readily filterable silica, separately recovering said fluoride solution and admixing therewith an aqueous solution of sodium aluminate in an amount to provide a substantially stoichiometric ratio of aluminum to fluorine, based on cryolite, then passing carbon dioxide gas into said admixed aluminate-fluoride solution in a carbonation zone maintained at a temperature of from 30° C. to 70° C. to precipitate cryolite, separately recovering said precipitated cryolite and residual carbonate liquor, and introducing said residual liquor into admixture with fresh amounts of said silicofluoride material.

3. Process as in claim 2 wherein said carbonate solution contains from 0.25 to 1.5 mols sodium ion per liter of solution.

4. Process as in claim 2 wherein said silicofluoride material and said carbonate solution are maintained with stirring for from 1 to 2.5 hours.

5. Process as in claim 2 wherein said carbonate liquor is admixed in an amount to provide from about 5% to about 8% excess sodium carbonate.

6. Process as in claim 2 wherein said silicofluoride and said carbonate solution are admixed and reacted until the alkalinity of the liquor is from over pH 7.0 to less than pH 8.0.

7. Process as in claim 2 wherein the fluorine-to-aluminum weight ratio of the admixed aluminate-fluoride solution is from 4.0 to 4.5.

8. Process as in claim 2 wherein the fluorine-to-aluminum weight ratio of said admixed aluminate-fluoride solution is 4.23.

9. Process as in claim 2 wherein said carbonation zone is maintained at a temperature of 60° C.

10. Process as in claim 2 wherein carbon dioxide gas is passed into said admixed solution until the solution being carbonated has pH 9.0 to 9.5.

11. Process as in claim 2 wherein said admixed aluminate-fluoride solution contains from 10 to 14 parts fluorine per 1000 parts water.

12. Process for producing cryolite which comprises continuously introducing into a reaction zone powdered sodium silicofluoride and a stream of aqueous dilute sodium carbonate liquor in an amount to provide from 5% to 8% excess sodium carbonate, admixing and reacting said compounds at a temperature of 60° C. to 95° C. to form reaction products consisting essentially of an aqueous solution of sodium fluoride and silica, precipitating the readily filterable silica separately recovering said fluoride solution and admixing therewith an aqueous solution of sodium aluminate in an amount to provide a fluorine-to-aluminum weight ratio of from 4.0 to 4.5, passing carbon dioxide into said admixed aluminate-fluoride solution at a temperature of from 45° C. to 60° C. to form carbonate liquor and to precipitate cryolite, separately recovering and calcining said precipitated cryolite, recovering residual carbonate liquor and introducing said liquor into admixture with fresh amounts of said sodium silicofluoride.

13. Continuous process for producing sodium cryolite which comprises reacting sodium silicofluoride and dilute sodium carbonate liquor containing a small excess of sodium carbonate to form reaction products consisting essentially of an aqueous solution of sodium fluoride and silica, precipitating the readily filterable silica separately recovering said aqueous solution of sodium fluoride substantially free of silica, comminuting used carbonaceous cathodes from aluminum reduction cells, leaching with aqueous caustic soda solution to recover an aqueous solution containing sodium aluminate and sodium fluoride, admixing said aqueous solutions to provide a combined solution having a fluorine-to-aluminum weight ratio of from 4.0 to 4.5, introducing carbon dioxide gas into said combined solution and reacting to precipitate cryolite and to form carbonate liquor, separately recovering said cryolite and said liquor and reacting said liquor with fresh amounts of sodium silicofluoride.

14. Process as in claim 13 wherein said sodium silicofluoride and said carbonate liquor are reacted until the pH is from over 7.0 to less than 8.0.

15. Continuous process for making sodium cryolite which comprises reacting from 5% to 8% excess dilute sodium carbonate liquor recovered in the process and sodium silicofluoride in a silicofluoride reaction zone at a temperature of from 60° C. to 95° C. for from 1 to 2.5 hours to form reaction products consisting essentially of an aqueous solution of sodium fluoride and silica, precipitating the readily filterable silica, separately recovering said solution substantially free of silica, comminuting used carbonaceous cathodes from aluminum reduction cells, extracting said comminuted cathodes with dilute aqueous caustic soda solution at a temperature of from 45° C. to 100° C. and recovering an aqueous solution of sodium aluminate and sodium fluoride, admixing said aqueous solutions in amounts to provide a combined solution having a fluorine-to-aluminum weight ratio of from 4.0 to 4.5, introducing carbon dioxide gas into said combined solution in a carbonation zone at a temperature of from 30° C. to 70° C. until pH of the liquor is from 8.0 to 10.0 to form carbonate liquor and to precipitate cryolite, separately recovering said cryolite and said formed carbonate liquor, and recycling said liquor to said silicofluoride reaction zone.

16. Process as in claim 15 wherein said fluorine-to-aluminum weight ratio is 4.23.

17. A process for producing sodium fluoride which comprises continuously introducing into a reaction zone at least one silicofluoride material selected from the group consisting of sodium silicofluoride and fluosilicic acid, and a stream of dilute aqueous solution of sodium carbonate, containing a small excess of sodium carbonate, admixing and reacting said materials to form reaction products consisting essentially of an aqueous solution of sodium fluoride and silica, precipitating the readily filterable silica, and separately recovering said sodium fluoride solution substantially free of silica.

18. A process for preparing sodium fluoride which comprises continuously introducing into a reaction zone maintained at from 60° C. to 95° C., a silicofluoride material selected from the group consisting of fluosilicic acid and powdered sodium silicofluoride, and a stream of dilute aqueous solution of sodium carbonate containing a small excess of sodium carbonate, admixing with agitation and reacting said compounds to form reaction products consisting essentially of an aqueous sodium fluoride solution and silica, precipitating the readily filterable silica, and separately recovering said sodium fluoride solution substantially free of silica.

19. The process of claim 18 wherein said carbonate solution contains 0.25 to 1.5 mols sodium ion per liter of solution.

20. The process of claim 18 wherein said silicofluoride material and said carbonate solution are maintained with stirring for from 1 to 2.5 hours.

21. The process of claim 18 wherein said carbonate liquor is admixed in an amount to provide from about 5% to about 8% excess sodium carbonate.

22. The process of claim 18 wherein said silicofluoride and said carbonate solution are admixed and reacted until the alkalinity of the liquor is from over 7.0 to less than 8.0.

23. A continuous process for preparing sodium fluoride which comprises reacting from 5 to 8% excess dilute sodium carbonate liquor and sodium silicofluoride in a silicofluoride reaction zone at a temperature of from 60° C. to 95° C. for from 1 to 2.5 hours to form reaction products consisting essentially of an aqueous solution of sodium fluoride and silica, precipitating the readily filterable silica, and separately recovering said sodium fluoride solution substantially free of silica.

References Cited in the file of this patent
UNITED STATES PATENTS

| | | |
|---|---|---|
| 1,324,030 | Bowman | Dec. 9, 1919 |
| 1,382,165 | Bishop | June 21, 1921 |
| 1,581,819 | Siegel | Apr. 20, 1926 |
| 2,196,077 | Morrow et al. | Apr. 2, 1940 |
| 2,567,544 | Brodal et al. | Sept. 11, 1951 |
| 2,585,387 | Feisler | Feb. 12, 1952 |
| 2,597,302 | Dale | May 20, 1952 |
| 2,714,053 | Albert et al. | July 26, 1955 |

FOREIGN PATENTS

| | | |
|---|---|---|
| 928,253 | France | Nov. 24, 1947 |

OTHER REFERENCES

Mellor: "Comprehensive Treatise on Inorganic and Theoretical Chemistry," vol. 2, p. 512 (1922), published by Longmans, Green and Co., N.Y.